3,505,669
ANGLE MEASURING APPARATUS WITH
DIGITAL OUTPUT
Elvin C. Welch, Culver City, Calif., assignor to International Telephone and Telegraph Corporation, New York, N.Y., a corporation of Maryland
Filed Aug. 19, 1965, Ser. No. 480,993
Int. Cl. H03k 13/20
U.S. Cl. 340—347                                    1 Claim

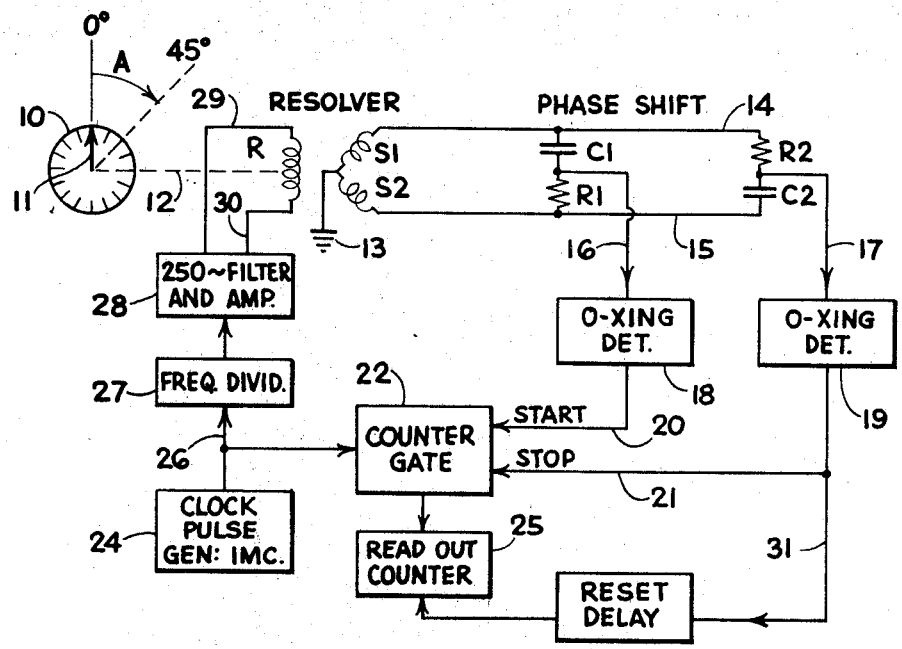
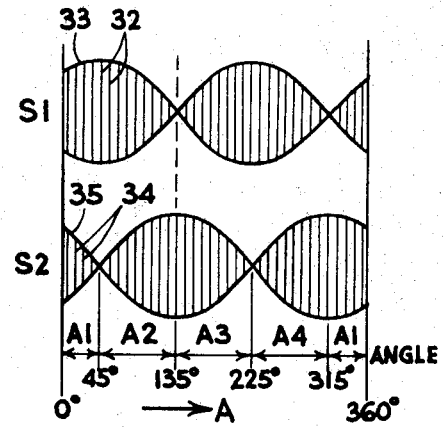
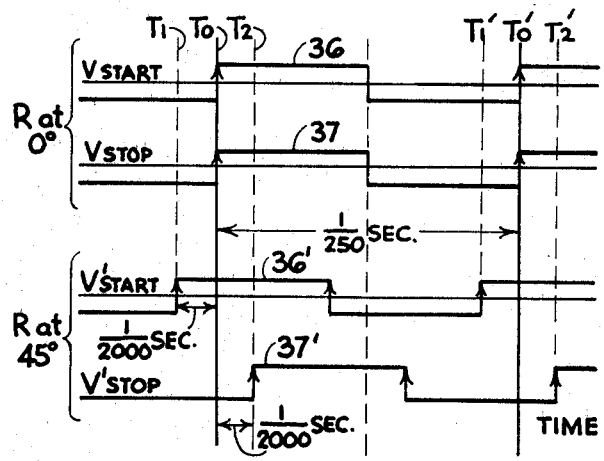
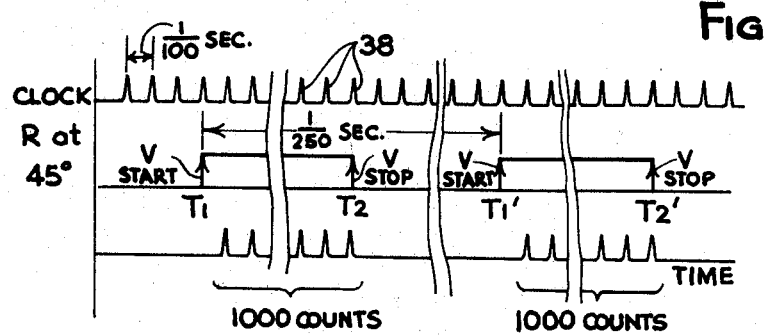
Fig. 1
Fig. 2
Fig. 3
Fig. 4
INVENTOR.
ELVIN C. WELCH
BY Elliott & Pastoriza
ATTORNEYS United States Patent Office 3,505,669
Patented Apr. 7, 1970

ABSTRACT OF THE DISCLOSURE

The invention includes apparatus for repeatedly generating a pulse count of a magnitude directly proportional to the angular position of an input shaft. The input shaft is connected to the rotor of a resolver. The resolver has two stator windings positioned in space quadrature. The stator windings are connected to phase-shift networks which act through zero-crossing detectors to gate pulses to a readout counter.

This invention relates generally to measuring systems and more particularly to a novel apparatus for providing a measurement of the angular position of a member such as a pointer or shaft.

There are many instances in which it is desired to provide an electrical system for reading the angular position of a member such as a shaft or pointer on an instrument. By transducing the shaft angle into an electrical signal, the angular position of the shaft may be automatically recorded. Further, the signal itself may be transmitted to a remote location and converted in a read-out device to provide a direct reading at such location of the shaft angle at all times.

Examples of various instruments for which the present angular measuring apparatus is useful are pressure and temperature transducers wherein a shaft or pointer assumes an angular position to indicate the pressure or temperature; flow rate meters; radar antennae, for indicating azimuth angles and/or elevation; and in any other number of instances in which angular movements are involved.

The direct output or angular movement is usually analog in form. If a corresponding analog electrical signal is generated directly from the shaft rotation, there is the usual problem of changes in the form of the signal during transmission to remote locations resulting in inaccuracy in the output readings. Further, the electrical output signal constituting an indication of the shaft angle in such analog systems is usually sensitive to temperature, voltage or frequency changes in the system, and phase shift over long transmision of the signals to a remote read-out.

Many of the above problems can be solved by initially converting the analog output representing shaft rotation or angular position into a digital code. However, to use conventional analog-to-digital converters and provide the desired accuracy, is excessively expensive. Incremental type encoders could be used but these are difficult to initially synchronize and any data lost over long distance transmission is irretrievable.

With all of the foregoing considerations in mind, it is a primary object of this invention to provide a novel angle measuring apparatus providing a digital output in which the foregoing problems are overcome.

More particularly, it is an object to provide an angle measuring apparatus having a digital output which is of a cost considerably lower than presently available equipment for achieving the same results.

Another important object is to provide an apparatus for indicating the angular position of a member which is extremely accurate even when the data is transmitted over long distances.

Another important object is to provide a dial pointer angle indicating and measuring apparatus providing a digital output which may, if desired, very easily be converted to an analog output at a remote location to operate a duplicate dial pointer.

Still another important object is to provide an angle measuring apparatus with a digital output which is so designed as to be readily usable in conjunction with conventional synchro units employed in equipment in which angular movements are to be measured.

Briefly, these and many other objects and advantages of this invention are attained by employing directly the output of a synchro or providing a resolver as a basic transducer, for converting the angular position of a member into an electrical signal. The output of the transducer is processed in such a manner as to accomplish a phase shift proportional to the angle of the member with respect to a given reference. This phase shift is then electronically converted to a suitable decimal or binary number as desired.

In the preferred embodiment of the invention, a resolver is employed providing first and second output signals which are passed into first and second phase shift network and detecting means to provide start and stop control signals. These start and stop control signals are separated by a time interval constituting a function of the angular position of the member or shaft being measured.

A source of electrical pulses such as a clock pulse generator is connected to a counter in turn controlled by the start and stop control pulses. A number of output pulses corresponding to the number that occur only during the referred to time interval are thus provided and constitute a function of the angular position of the member or shaft.

In accord with an extremely important feature of this invention, the A-C exciting signal for the resolver has a given frequency which is derived from the clock-pulse generator. By this arrangement, any drifts in frequency will affect both the resolver and therefore the start and stop control signals, and frequency of pulses to the counter so that the number of pulses counted during the given time interval will be the same for a given angle even though there may be frequency changes involved.

In addition, because there is measured a phase difference between first and second output signals from the resolver, the absolute time positions of the individual signals themselves are of no consequence so that any phase shifts occurring over long transmission distances affect both signals in the same manner, the difference in phase remaining the same.

A better understanding of the invention will be had by now referring to one embodiment thereof as illustrated in the accompanying drawings, in which:

FIGURE 1 is a schematic diagram partly in block form illustrating a resolver and other basic components making up the angle measuring apparatus of this invention;

FIGURE 2 illustrates various magnitudes of first and second output signals from the resolver stator coils illustrated in FIGURE 1 for various angular positions of a member;

FIGURE 3 illustrates the manner in which start and stop control signals are derived from a processing of the output signals from the resolver in accord with the system of FIGURE 1; and, FIGURE 4 illustrates a series of clock pulses and the manner in which portions of these pulses are selected to provide a digital read-out for indicating the angular position of the member or shaft illustrated in FIGURE 1.

Referring first to FIGURE 1, there is shown in the upper left hand portion a dial 10 provided with a pointer 11. For purposes of describing one embodiment of the present invention, it will be assumed that it is desired to provide a remote read-out of the angular position of the pointer 11 with respect to the dial 10. It will also be assumed that it is desired to provide a digital type read-out for direct processing in a computer or for operating any suitable digital read-out mechanism.

Towards the foregoing ends, there is provided a transducer means for generating an electrical signal of characteristics determined by the angular position of the shaft 11. This transducer means includes a resolver having a rotor coil R coupled to the shaft of the pointer 11 as indicated at 12 so that the rotor R will assume an angular position constituting a function of the angular position of the pointer 11. As shown, the resolver in addition has first and second stator coils S1 and S2 with their inner ends connected together and grounded as at 13 and their outer ends connecting to leads 14 and 15. First and second phase shift networks connect across the leads 14 and 15 as shown. The first of these phase shift networks includes a series connected capacitance C1 and resistance R1 and a first output lead 16 passing from the junction of the capacitance C1 and the resistance R1. The second phase shift network includes a series connected resistance R2 and capacitance C2 with the resistance and capacitance in opposite positions relative to the first mentioned phase shift network. A second output lead 17 passes from the junction of the resistances R2 and capacitance C2 as shown.

The output signals appearing on the output leads 16 and 17 are respectively passed into first and second zero-crossing detectors 18 and 19. These detectors function as high gain amplifiers to provide square wave outputs on output leads 20 and 21. Suitable start and stop control signals, in turn, are derived from these square wave outputs and fed into a counter means including a counter gate 22. The counter gate 22 is connected at 23 to receive a series of electrical pulses provided by a clock pulse generator 24. A read-out counter 25 comprising part of the counter means receives a portion of the pulses passed by the counter gate 22 occurring during the time interval between the start control signal applied to the counter gate to open the gate and the stop control signal applied to the counter gate to close the gate.

The clock pulse generator 24 is also employed to synchronize the A-C exciting signal for the rotor of the resolver. Thus, the series of electrical pulses generated from the clock pulse generator pass through a lead as indicated at 26 to a frequency divider 27. The divided frequency pulses are then passed to a filter and amplifier circuit 28 to provide an exciting A-C signal for the rotor of the resolver of given frequency. Since the frequency of this A-C signal is derived from the clock pulse generator, the frequency of the clock pulses corresponds to an integral multiple of the given frequency of the A-C exciting signal for the rotor coil R.

The circuit is completed, in the particular embodiment illustrated, by a suitable reset signal line 31 passing through a reset delay to the read-out counter 25 from the stop control signal lead 21. The reset signal in the lead 31 serves to reset the read-out counter after reception by the counter of each series of pulses received from the counter gate so that the numerals displayed on the read-out counter 25 during the delay between the stop control signal and reception of the reset signal will represent the number of pulses occurring during the time interval between the start and stop signals. This number of pulses will vary depending upon variations in the time interval which, in turn, depend upon the angular position of the rotor coil R of the resolver relative to the first and second stator windings S1 and S2.

The manner in which the foregoing circuit operates will become clearer by now referring to FIGURES 2, 3, and 4 in conjunction with FIGURE 1. For purposes of setting forth a specific example, assume that the clock pulse generator 24 provides a series of electrical pulses at a frequency of 1 megacycle per second. These pulses are frequency divided by the frequency divider 27 to a 250 cycle per second signal which is amplified and filtered by the circuits 28 to provide a 250 cycle per second A-C sine wave for energizing the rotor coil R.

When the dial pointer 11 is in zero position as indicated in FIGURE 1, the rotor coil R is positioned at 45° to the first and second stator windings S1 and S2. As a consequence, these stator windings will have induced therein voltages of equal amplitude. Moreover, in view of the orientations of the stator coils S1 and S2 relative to the rotor coil R when in the zero degree position, the 250 cycle per second signal induced in each of these coils will be in phase with each other.

The foregoing situation is depicted in FIGURE 2 for the 0° position of the rotor. As the rotor coil R moves through an angle from 0° towards 45°, the amplitude of the 250 cycle per second signal in the stator coil S1, shown at 32, will increase as indicated by the envelope 33, and the 250 cycle per second signal in the stator coil S2, shown at 34, will decrease as indicated by the envelope 35. This is because as the rotor coil R rotates towards 45°, it approaches maximum flux coupling relationship with the coil S1 when the axes of the rotor and first stator coils are parallel, and approaches a minimum flux coupling relationship with the second stator coil S2 when the axes of the rotor and second stator coils are at 90°.

It will be noted that when the angle A of the rotor is at 45°, the signal in the stator coil S1 is maximum and the signal in the stator coil S2 is minimum or approximately 0.

As the rotor coil R passes through angles from 45° to 135°, the reverse situation obtains wherein the voltage induced in the second stator coil S2 increases and the voltage in the first stator coil S1 decreases. Thus, at 135°, the rotor coil R is at right angles to the stator coil S1 and parallel to the stator coil S2.

The envelopes 33 and 35 indicating the amplitudes of the signals appearing in the first and second stator coils at various angles of the rotor coil R will thus vary substantially sinusoidally with rotation of the rotor coil. If the rotor coil assumes any one particular angular position, the amplitude of the signal induced in the stator coil S1 will remain at a value corresponding to the particular value of the envelope in FIGURE 2 for the particular angle involved, the 250 cycle per second signal serving as a carrier. The same situation obtains with the second stator coil S2.

Another important consideration with respect to FIGURE 2 is the fact that in the angular range between 0° and 45°, the 250 cycle per second signal induced in the coils S1 and S2 are in phase with each other. This is a necessary consequence of the fact that both the stator coils S1 and S2 are excited from the same rotor coil R. However, between 45° and 135°, the orientation of the coil S2 with respect to the rotor coil R changes so that the 250 cycle per second signal 34 between 45° and 135° is out of phase with the 250 cycle signal 32 for the stator coil S1 between 45° and 135°. At the crossover point of 135° for the signal induced in the coil S1, there again occurs a reversal of phase so that the two 250 cycle per second signals 32 and 34 are in phase between 135° and 225°. Again at the next crossover point for the second stator coil S2 the signals are out of phase, and so forth.

In FIGURE 2, the angular ranges indicated by the double headed arrows A1 and A3 define angles at which the signals are in phase and the angular ranges indicated by the double headed arrows A2 and A4 define angles at which the signals are 180° out of phase.

Assume for the purposes of further description of the operation, that the dial 11 stays at 0° so that the angle A is 0 and the rotor coil R assumes the position illustrated in FIGURE 1. As stated, for this situation, the amplitude of the 250 cycle per second signals in the coils S1 and S2 are equal and in phase. These signals are passed along the leads 14 and 15 across which the phase shift networks are connected. It can be shown that the first and second phase shift networks will advance the phase of the signal in the stator coil S1 by an amount proportional to the angle A of the rotor and retard the phase of the signal in the stator coil S2 by a similar amount. Since the rotor R is assumed to be at a 0 position so that the angle A is 0, the first and second output signals appearing on the output leads 16 and 17 will be in phase. However, as the rotor moves from, for example, 0° to 45°, the magnitudes of the respective signals in the first and second stator coils as indicated in FIGURE 2 will be different resulting in a phase shift of each signal proportional directly to the actual angle A assumed by the rotor.

Referring now to FIGURE 3, there is shown at 36 and 37 square wave outputs each of frequencies of 250 cycles per second derived from the first and second 250 cycle signals on the output leads 16 and 17. Since the signals on the output leads 16 and 17 are in phase for a 0° rotor position, the square waves 36 and 37 are in phase as shown. However, as the rotor moves towards a 45° position, the square wave derived from the output signal in the lead 16 will be advanced in phase and the square wave derived from the output lead 17 will be retarded in phase. This latter situation is indicated by the reproduction of the square waves as at 36′ and 37′ in FIGURE 3 for the rotor position of 45°.

Since the degree of phase shift is directly proportional to the angle assumed by the rotor, the advance in phase of the signal 36′ as shown in FIGURE 3 will be $\frac{1}{2000}$ of a second or 500 microseconds which represents $\frac{1}{8}$ of the period for the 250 cycle per second signal or $\frac{1}{8}$ of a complete rotation of 360° corresponding to the 45° rotor position. Similarly, the square wave signal 37′ will be retarded in phase by the same amount so that the phase difference between the signals 36′ and 37′ corresponds to twice the angle assumed by the rotor.

The leading edge of the positive going square waves for the first signals such as indicated at 36 and 36′ are indicated as start control signals whereas the positive going leading edge of the square waves for the second signals such as 37 and 37′ are designated as stop control signals. It will be clear that the time interval between the start control signal and the stop control signal resulting from a phase shift will be directly proportional to twice the angle assumed by the rotor.

As shown in FIGURE 1, the counter gate 22 is opened or placed in condition to pass clock pulses from the clock pulse generator 24 by the start signal on the lead 20. These pulses are passed to the readout counter 25. The stop control signal when received by the counter gate then closes the gate so that the number of pulses received by the readout counter 25 during the time interval will constitute a function of the angle A.

With reference to FIGURE 4, the foregoing situation is depicted graphically wherein the clock pulses which are assumed to be of 1 megacycle per second frequency are indicated at 38. Continuing with the example wherein the rotor R is at 45°, at the time T1 shown in FIGURES 3 and 4, the start control signal will open the counter gate 22 so that the pulses 38 received in the counter gate will be passed to the readout counter 25. At the time T2, the stop control signal will close the counter gate and there will thus be registered in the readout counter 25 a series of pulses, the number of which is determined by the time interval between T1 and T2. Since this time interval is 1 milliseconds as is evident from FIGURE 3, the number of pulses will be 1000 and the readout counter 25 will indicate 1000 counts.

The stop control signal will also initiate a reset signal on the line 31 of FIGURE 1 to reset the readout counter 25 after a short delay so that sufficient time will be available to read the 1000 count display or pass this count onto a computer. Thus, when the next start control pulse to the counter gate 22 is received as at T1′ shown in FIGURES 3 and 4, the readout counter will again start a count and at the time T2 will register 1000 counts, assuming that the rotary R is still at 45°. The readout counter will thus continuously appear to register a readout of 1000 during the delay time introduced by the reset delay at a frequency of 250 times per second so that it will appear to the eye as a steady number.

If the rotor moves from the 45° position, the resulting phase shift of the signals as described in FIGURE 3 will change the time interval so that more or less counts will be received depending upon the position of the rotor. For the case of the rotor position of 45°, wherein 1000 counts are registered, it will be evident that each count corresponds to .045° and thus the system is capable of measuring angles to an accuracy of .045°.

It will be evident from the nature of the wave forms described in FIGURES 2 and 3 that ambiguities occur if the pointer is beyond 180°. This is a consequence of the fact that the time interval between the start and stop signals is proportional to twice the angle A. In cases in which angular positions greater than 180° are to be measured, the problem may be readily solved by simply coupling the rotor R to the actual shaft with a gear ratio such that the rotor R will move through one-half the angular distance of the shaft.

The foregoing described angle measuring system is readily adaptable to use with synchros incorporated in equipment having angular movements. Thus, suitable first and second signals corresponding to the signals appearing in the stator coils S1 and S2 of FIGURE 1 may be derived directly from the synchro unit by employing a simple transformer for converting the voltages appearing in the three synchro coils to voltages corresponding to those that would be induced in the coils S1 and S2 if a resolver were used. For example, a simple Scott "T" transformer can effect this transformation. The resolver rotor described in FIGURE 1 and mechanical coupling as indicated by the line 12 to the pointer or shaft, the angle of which is to be measured, may thus be eliminated, the signals being derived directly from the synchro unit through the Scott "T" transformer.

It will also be readily appreciated from the foregoing description that should any drift in the frequency from the clock pulse generator 24 occur, the 250 cycle per second signals derived from the clock pulse frequency will also vary so that the time interval between the start and stop signals applied to the counter gate will vary with the result that the same number of readout pulses will be counted in the counter 25 for a given angular position even though frequency drifts occur. Accordingly, any changes in frequency as a consequence of temperature and the like do not affect the accuracy of the equipment.

Moreover, since a phase difference between the signals on the output leads 16 and 17 from the phase shift networks is employed as an indication of the angle, the absolute time positions of these signals are of no consequence. Thus, in transmitting the output from the resolver and phase shift networks over great distances, any phase shift as would occur during the transmission will affect both of the signals 16 and 17 in the same manner so that the net difference in phase still remains the same.

While a simple digital count or decimal output has been described in the illustrated embodiment of the invention, it will be evident that the decimal counts from the readout counter 25 may be converted to a binary digital code or alternatively into an analog signal by simply providing an analog output voltage proportional to the number of counts. This latter can be achieved by summing the counts on a storage capacitance or by equivalent electrical means will known to those skilled in the art. The angle measuring apparatus providing a digital output is, accordingly, not to be thought of as limited to the one particular example set forth merely for illustrative purposes.

What is claimed is:

1. Apparatus for repeatedly generating a number of pulses directly proportional to the angle of rotation of an input shaft, said apparatus comprising: a resolver having a rotor winding and two stator windings having axes disposed 90 mechanical degrees apart, one end of each stator winding being connected to a point of reference potential; first and second phase shift circuits connected in parallel from the other end of one of said stator windings to the other end of the other of said stator windings, said first and second circuits being adapted to produce output signals leading and lagging, respectively, the phase of the signal appearing thereacross; first and second zero crossing detectors connected from said first and second phase shift circuits, respectively, each of said phase shift circuits including a series-connected capacitor and resistor, the capacitor of said first circuit and the resistor of said second circuit being connected from said one stator, said detectors being connected from the respective mutual junctions of said capacitors and said resistors; a clock pulse generator for producing clock pulses at a substantially constant repetition rate; a pulse counter means, said counter means including a readout pulse counter and delay means responsive to the output of only said second detector for resetting said counter to zero; a gate actuable to pass said clock pulses to said counter means, said first detector being adapted to open said gate, said second detector being adapted to close said gate; and source means to supply an alternating signal to said resolver rotor winding, said source means including a frequency divider connected from the output of said clock pulse generator, and a filter and amplifier connected from said frequency divider to said rotor winding.

References Cited

UNITED STATES PATENTS

| | | | |
|---|---|---|---|
| 2,894,256 | 7/1959 | Kronacher | 340—347 |
| 3,227,863 | 1/1966 | Windsor | 340—347 |
| 3,238,361 | 3/1966 | Frisch | 235—154 |
| 3,255,448 | 6/1966 | Sadvary et al. | 340—347 |
| 3,357,012 | 12/1967 | Brook | 340—347 |
| 2,980,900 | 4/1961 | Rabin | 340—347 |
| 3,092,718 | 6/1963 | Wullert | 340—347 |
| 3,136,987 | 6/1964 | Bock et al. | 340—347 |
| 3,152,324 | 10/1964 | Webb | 340—347 |
| 3,353,175 | 11/1967 | Brook et al. | 340—347 |

FOREIGN PATENTS

| | | |
|---|---|---|
| 1,344,337 | 9/1962 | France. |
| 1,015,608 | 1/1966 | Great Britain. |

MAYNARD R. WILBUR, Primary Examiner

C. D. MILLER, Assistant Examiner